(12) United States Patent
Griffith et al.

(10) Patent No.: US 10,955,081 B1
(45) Date of Patent: Mar. 23, 2021

(54) LATERAL REINSTATEMENT CUTTER

(71) Applicants: Jonathan R Griffith, Winchester, CA (US); Adam L Einsel, El Cajon, CA (US)

(72) Inventors: Jonathan R Griffith, Winchester, CA (US); Adam L Einsel, El Cajon, CA (US)

( * ) Notice: Subject to any disclaimer, the term of this patent is extended or adjusted under 35 U.S.C. 154(b) by 0 days.

(21) Appl. No.: 16/680,297

(22) Filed: Nov. 11, 2019

(51) Int. Cl.
| | |
|---|---|
| *F16L 55/18* | (2006.01) |
| *F16L 55/179* | (2006.01) |
| *F16L 55/26* | (2006.01) |
| *H04N 7/18* | (2006.01) |
| *F21Y 115/10* | (2016.01) |

(52) U.S. Cl.
CPC ............. *F16L 55/18* (2013.01); *F16L 55/179* (2013.01); *F16L 55/265* (2013.01); *F21Y 2115/10* (2016.08); *H04N 7/18* (2013.01)

(58) Field of Classification Search
CPC ........ F16L 55/179; F16L 55/18; F16L 55/265
USPC ............................................ 405/184.1, 184.3
See application file for complete search history.

(56) References Cited

U.S. PATENT DOCUMENTS

| | | | | | |
|---|---|---|---|---|---|
| 4,577,388 | A | * | 3/1986 | Wood ................... | B23Q 9/0014 29/558 |
| 4,648,454 | A | * | 3/1987 | Yarnell ................... | B23B 41/00 166/297 |
| 4,819,721 | A | * | 4/1989 | Long, Jr. ................... | E03F 3/06 166/55 |
| 5,044,824 | A | * | 9/1991 | Long, Jr. ................... | E03F 3/06 156/287 |
| 5,207,031 | A | * | 5/1993 | Gammelgaard .......... | E03F 3/06 451/440 |
| 5,960,882 | A | * | 10/1999 | Polivka ................. | F16L 55/265 166/297 |
| 6,123,109 | A | * | 9/2000 | Kamiyama ........... | F16L 55/265 138/97 |
| 9,512,952 | B2 | * | 12/2016 | Rogers .................. | F16L 55/265 |
| 2005/0103538 | A1 | * | 5/2005 | Cotton .................. | F16L 55/265 180/9.1 |
| 2009/0223335 | A1 | * | 9/2009 | Tsujisama ............. | F16L 55/265 83/177 |
| 2014/0165869 | A1 | * | 6/2014 | Flanery ................. | F16L 55/265 104/138.2 |
| 2014/0169886 | A1 | * | 6/2014 | Rogers .................. | F16L 55/265 405/184.2 |

* cited by examiner

*Primary Examiner* — Frederick L Lagman
(74) *Attorney, Agent, or Firm* — John R. Ross; John R. Ross, III

(57) ABSTRACT

A lateral reinstatement cutter. A lower arm is rigidly attached to a base. A pneumatic piston is pivotally attached to the base. A pneumatic cutter is pivotally attached to the lower arm about a lower arm pivot axis and is also pivotally attached to the pneumatic piston. A camera is rigidly attached to the pneumatic cutter. The pneumatic cutter is raised and lowered by expanding and contracting the pneumatic piston causing the pneumatic cutter to pivot about the lower arm pivot axis.

3 Claims, 5 Drawing Sheets

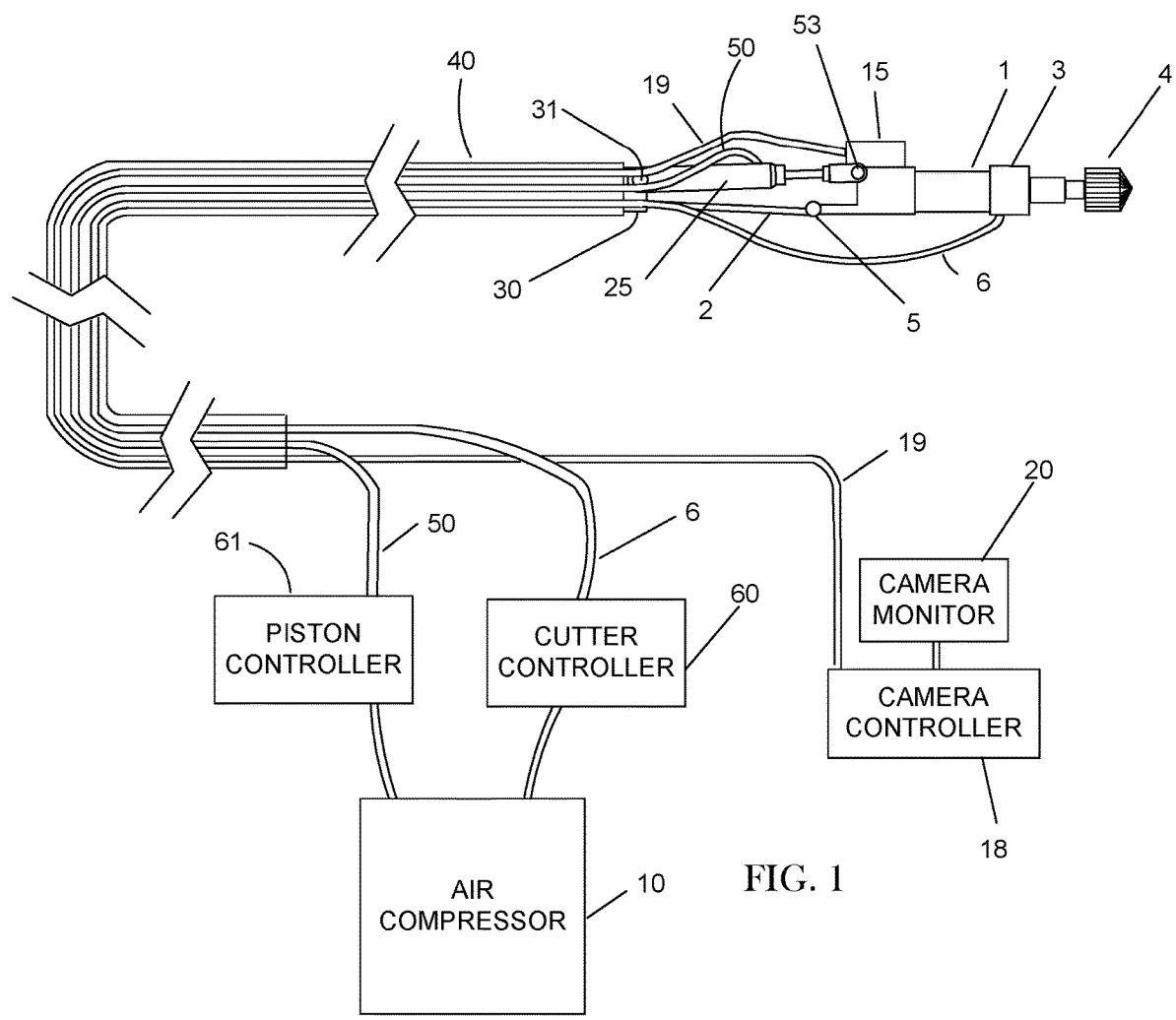
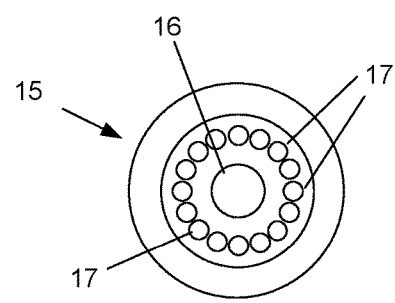
FIG. 1
FIG. 2

LATERAL REINSTATEMENT CUTTER

The present invention relates to sewer clearing devices, and in particular, to lateral reinstatement cutters.

BACKGROUND OF THE INVENTION

Most modern residential and commercial buildings include sewage piping. As sewer pipes age it is common for them to deteriorate and leak. To repair the sewage piping system the pipes must be rehabilitated. The modern method of pipe rehabilitation involves relining the existing pipes with a cured-in-place PVC reliner to form a sealed pipe-within-a-pipe.

As a pipe is relined the connections for lateral pipes may become blocked by the relining material. Lateral reinstatement cutters are known in the prior art and are used to cut out these reliner blockages. Unfortunately, however, prior art lateral reinstatement cutters tend to be very cumbersome, expensive and difficult to operate.

What is needed is a better lateral reinstatement cutter.

SUMMARY OF THE INVENTION

The present invention provides an improved lateral reinstatement cutter. A lower arm is rigidly attached to a base. A pneumatic piston is pivotally attached to the base. A pneumatic cutter is pivotally attached to the lower arm about a lower arm pivot axis and is also pivotally attached to the pneumatic piston. A camera is rigidly attached to the pneumatic cutter. The pneumatic cutter is raised and lowered by expanding and contracting the pneumatic piston causing the pneumatic cutter to pivot about the lower arm pivot axis.

BRIEF DESCRIPTION OF THE DRAWINGS

FIG. 1 shows a preferred embodiment of the present invention.

FIG. 2 shows a preferred camera.

DETAILED DESCRIPTION OF THE PREFERRED EMBODIMENTS

Figure 3:
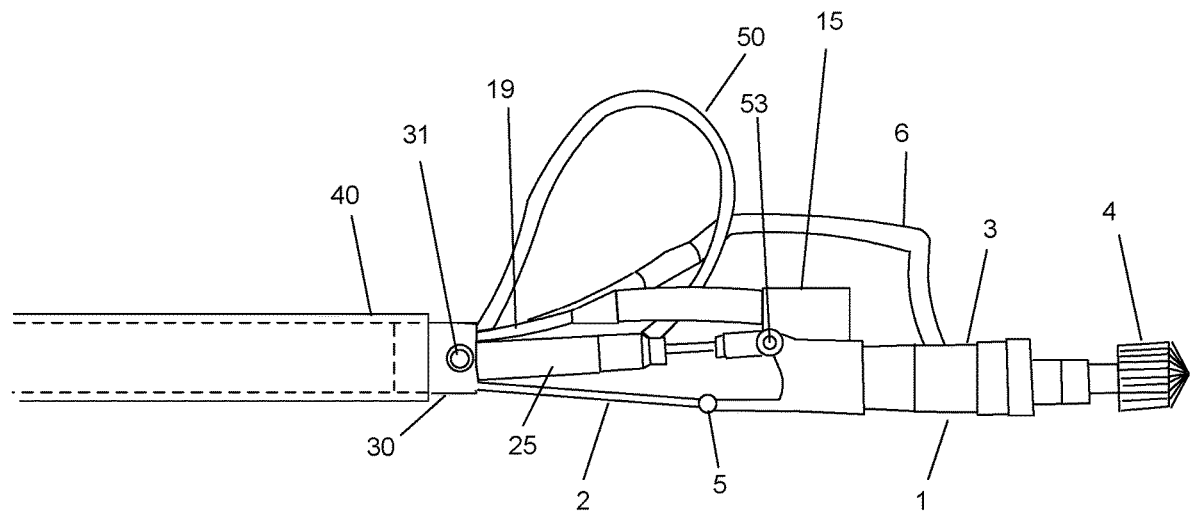
FIGS. 3-4 show a preferred embodiment of the present invention.

FIGS. 1-4 show a preferred embodiment of the present invention. Pneumatic cutter 1 is pivotally attached to lower arm 2 at pivot axis 5. Lower arm 2 is rigidly attached to base 30. Base 30 is rigidly press fit into conduit 40 (see also FIG. 5). Cutter 1 includes pneumatic motor 3 and rotatably connected cutting tool 4. Pneumatic supply line 6 provides compressed air from air compressor 10 to motor 3 to rotate cutting tool 4. An operator controls the flow of compressed air from air compressor 10 to motor 3 by operation of cutter controller 60.

Camera 15 is rigidly attached to cutter 1 as shown. In a preferred embodiment, camera 15 is bolted onto cutter 1. FIG. 2 shows a front view of camera 15. Camera 15 includes camera lens 16 and multiple LEDs 17. Camera 15 is connected to camera controller 18 via control cable 19. Camera monitor screen 20 is also connected to camera controller 18.

Spring biased linear pneumatic piston 25 is pivotally attached to base 30 at pivot axis 31 and pivotally connected to cutter 1 at pivot axis 53. Pneumatic piston 25 is preferably spring biased in the extended position shown in FIG. 1. Pneumatic supply line 50 is connected to piston 25 as shown. Pneumatic supply line 50 provides compressed air from air compressor 10 to piston 25 to retract piston 25. An operator controls the flow of compressed air from air compressor 10 to motor piston 25 by operation of piston controller 61.

Figure 4:
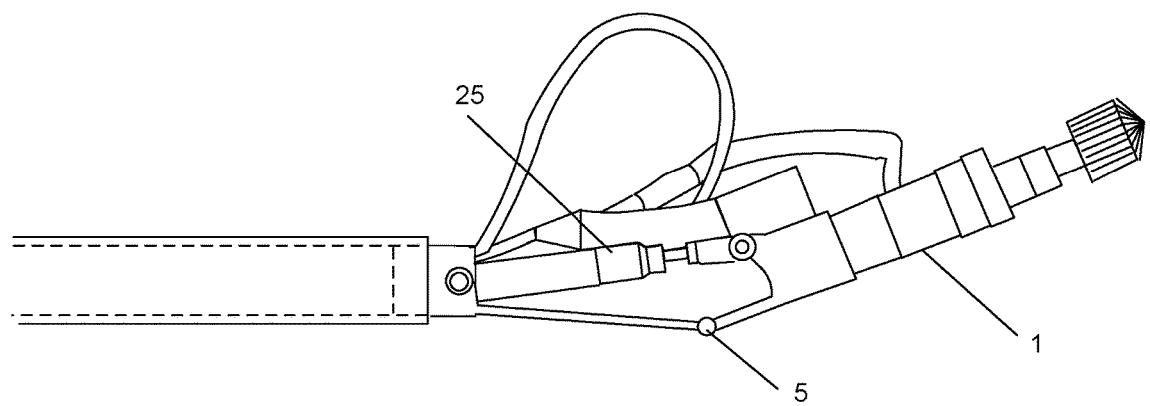
Figure 5:
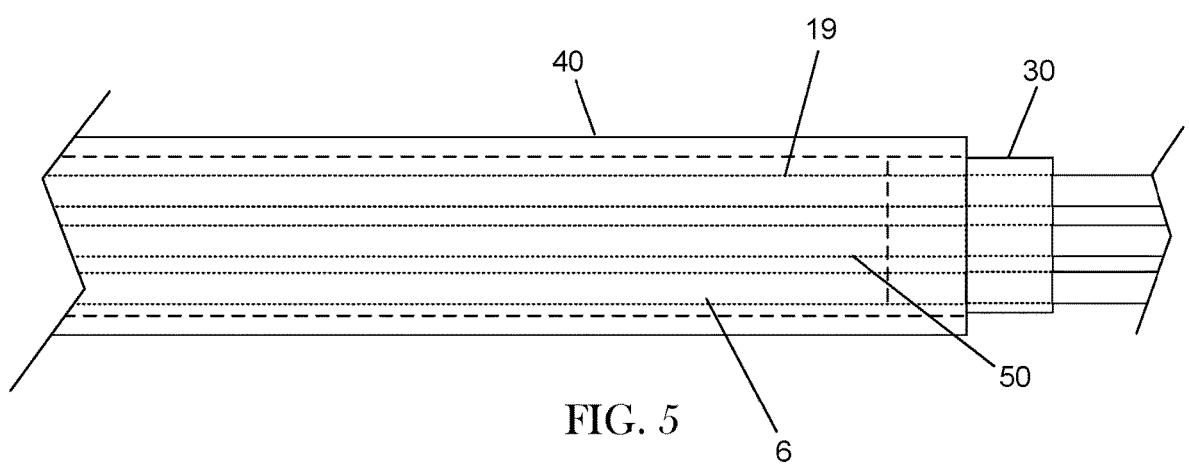
FIG. 5 shows a preferred conduit.

For example, in FIG. 4 the operator has utilized piston controller 61 to allow compressed air to flow to piston 25. This has cause piston 25 to contract, thereby causing cutter 1 to pivot counterclockwise about pivot axis 5, as shown.

Utilization of a Preferred Embodiment of the Present Invention

FIG. 6-9 show a utilization of a preferred embodiment of the present invention.

Figure 6:
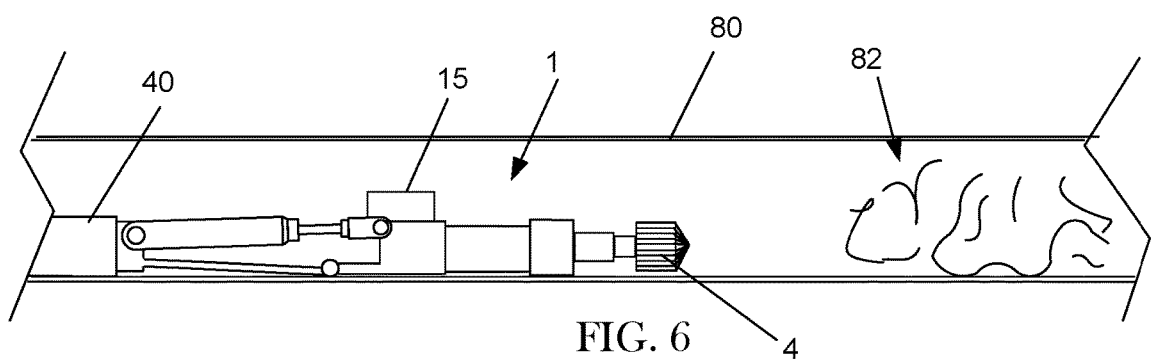
FIGS. 6-9 show a method for utilizing a preferred embodiment of the present invention.

In FIG. 6, the operator has inserted cutter 1 into a 3-inch mainline pipe 80 is pushing conduit 40 to the right. Camera 15 is on and LEDs 17 (FIG. 2) are on and illuminating pipe 80 so that the operator can view the inside of pipe 80 on monitor 20 (FIG. 1) as cutter 1 moves forward. In FIG. 6 the operator has viewed debris and obstruction 82. The operator can clear the debris and obstruction by turning on cutter 1 and cutting through the debris and obstruction using cutting tool 4.

Figure 7:
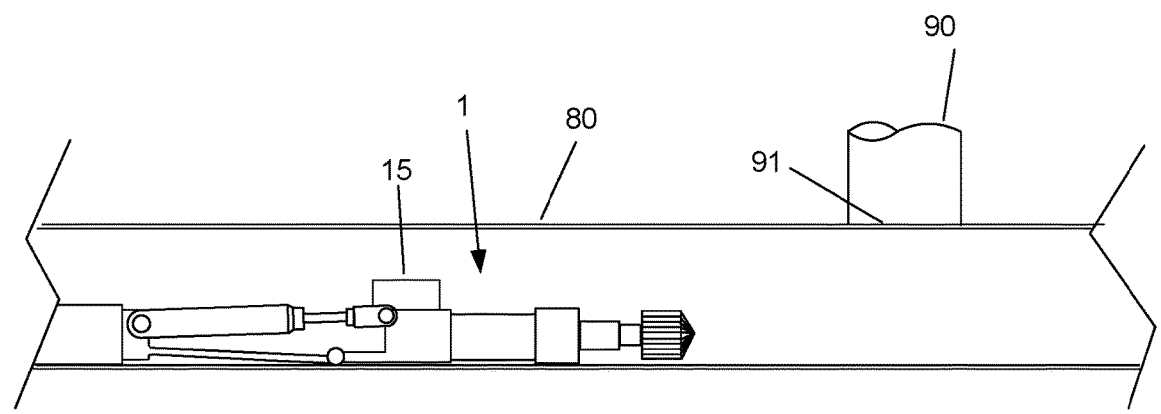

In FIG. 7, the operator has cleared debris and obstruction 82 and has moved cutter 1 further to the right by pushing forward conduit 40. By viewing monitor 20 the operator sees connection of lateral pipe 90 is covered by reliner 91.

Figure 8:
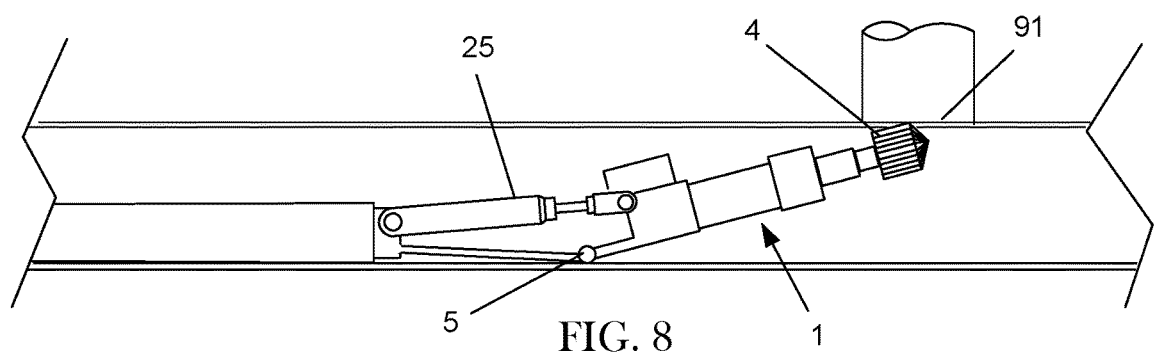

In FIG. 8, the operator has moved cutter 1 further to the right. The operator has utilized piston controller 61 (FIG. 1) to direct the flow of compressed air to piston 25, thereby causing piston 25 to contract. This has caused cutter 1 to pivot counterclockwise about axis 5 so that cutting tool 4 is moved upward and is in contact with reliner 91.

Figure 9:
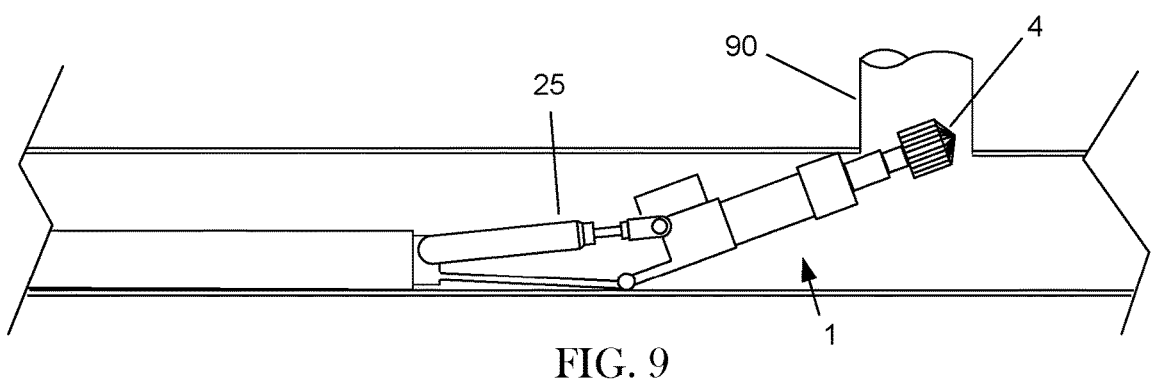

In FIG. 9, the operator has allowed more compressed air to flow through to piston 25 so that cutter 1 has pivoted further counterclockwise and cutting tool 4 has now cut through and cleared the section of reliner 91 that was covering lateral pipe 90. After the reliner has been cut away, cutting tool 4 may be lowered by utilizing piston controller 61 to release compressed air pressure from piston 25.

Other Preferred Embodiment

Figure 10:
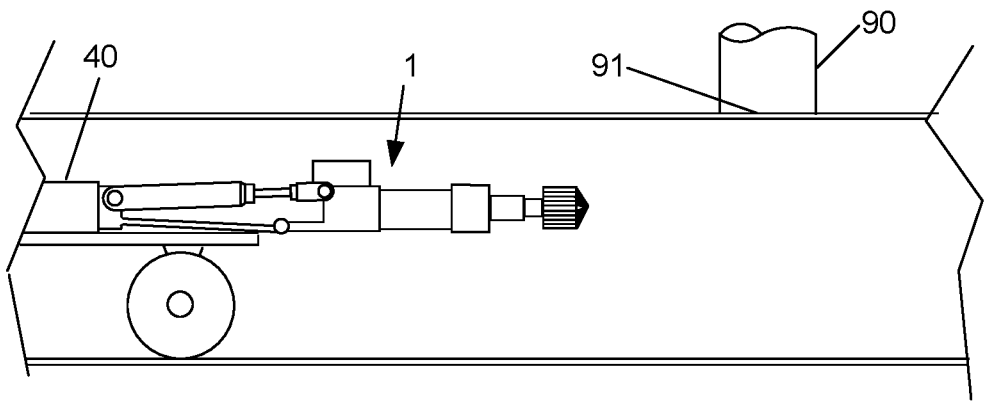
FIGS. 10-12 show a method for utilizing another preferred embodiment of the present invention.
Figure 11:
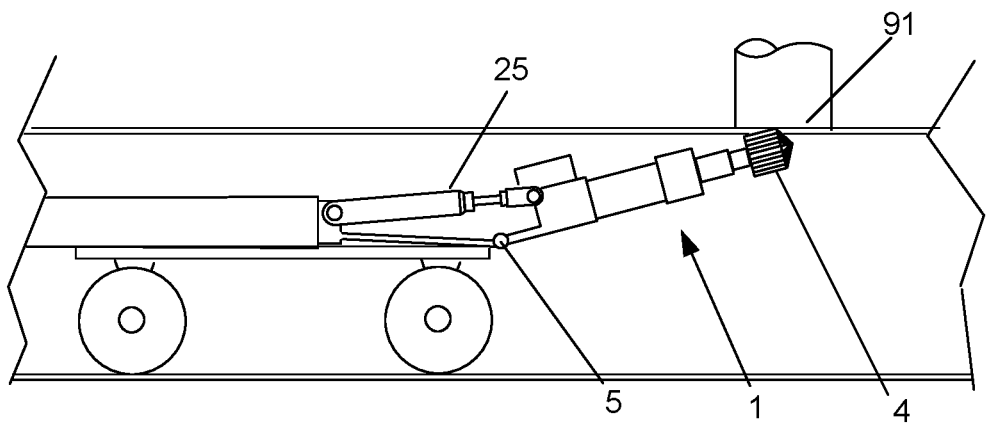
Figure 12:
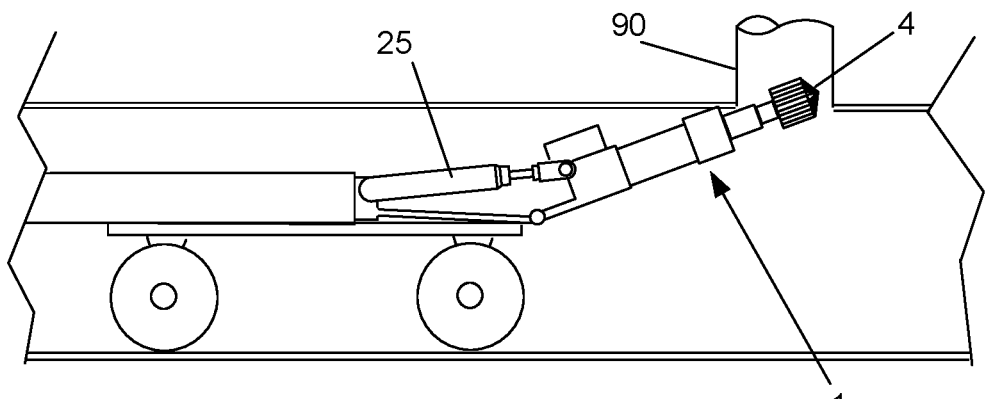

FIGS. 10-12 show the utilization of another preferred embodiment of the present invention. In FIGS. 10-12, cutter 1 is attached to top of wheeled carriage 95. Wheeled carriage 95 increases the height of cutter 1 so that cutter 1 can be placed inside a larger sized mainline pipe. For example, in FIGS. 10-15 mainline pipe 67 is a 6-inch diameter pipe. Cutter 1 can then be used to reliner covering lateral pipe connections in a fashion similar to that shown in the above preferred embodiment.

For example, in FIG. 10, the operator has moved cutter 1 to the right by pushing forward conduit 40. By viewing monitor 20 the operator sees that the connection of lateral pipe 90 is covered by reliner 91.

In FIG. 11, the operator has moved cutter 1 further to the right. The operator has utilized piston controller 61 (FIG. 1) to direct the flow of compressed air to piston 25, thereby causing piston 25 to contract. This has caused cutter 1 to pivot counterclockwise about axis 5 so that cutting tool 4 is moved upward and is in contact with reliner 91.

In FIG. 12, the operator has allowed more compressed air to flow through to piston 25 so that cutter 1 has pivoted further counterclockwise and cutting tool 4 has now cut through and cleared the section of reliner 91 that was covering lateral pipe 90.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A lateral reinstatement cutter, comprising:
   A. a base,
   B. a lower arm rigidly attached to said base,
   C. a pneumatic piston pivotally attached to said base,
   D. a pneumatic cutter, pivotally attached to said lower arm about a lower arm pivot axis and pivotally attached to said piston,
   E. a camera rigidly attached to said cutter,
   F. a conduit wherein said base is press fit into said conduit,
   G. a camera controller connected to said camera via a camera cable,
   H. a camera monitor connected to said camera controller, said camera monitor for receiving and displaying images received from said camera,
   I. an air compressor,
   J. a cutter controller connected to said air compressor and for controlling the delivery of compressed air to said cutter via a cutter pneumatic supply line,
   K. a piston controller connected to said air compressor and for controlling the delivery of compressed air to said piston via a piston pneumatic supply line,
      wherein said cutter is raised and lowered by contracting and expanding said piston causing said cutter to pivot about said lower arm pivot axis, wherein said camera cable, said cutter pneumatic supply line and said piston pneumatic supply line are covered by and extend through said conduit and said base.

2. The lateral reinstatement cutter as in claim 1, wherein said camera comprises:
   A. a plurality of LEDs, and
   B. a camera lens.

3. The lateral reinstatement cutter as in claim 1, further comprising a wheeled carriage connected to said base to increase the height of said lateral reinstatement cutter.

* * * * *